Sept. 10, 1968  J. R. GRIFFIN  3,401,212
TWO-STAGE BLOCK COPOLYMERIZATION OF PROPYLENE
AND ETHYLENE EMPLOYING HYDROGEN
Filed Dec. 2, 1964  2 Sheets-Sheet 1

INVENTORS.
JOHN R. GRIFFIN,
BY ALVA M. JONES,
RAYMOND A. SPEED,

ATTORNEY.

United States Patent Office 3,401,212
Patented Sept. 10, 1968

3,401,212
TWO-STAGE BLOCK COPOLYMERIZATION OF PROPYLENE AND ETHYLENE EMPLOYING HYDROGEN
John R. Griffin, Alva M. Jones, and Raymond A. Speed, Baytown, Tex., assignors by mesne assignments, to Esso Research and Engineering Company, Elizabeth, N.J., a corporation of Delaware
Filed Dec. 2, 1964, Ser. No. 415,541
14 Claims. (Cl. 260—878)

ABSTRACT OF THE DISCLOSURE

In the production of film-grade copolymer of propylene and ethylene, the haze and gloss properties are improved by the addition of hydrogen into the second of a two-stage reaction zone wherein ethylene is reacted onto polypropylene chains. A similar process is used to improve the characteristics of injection-grade copolymer.

Figure 1:
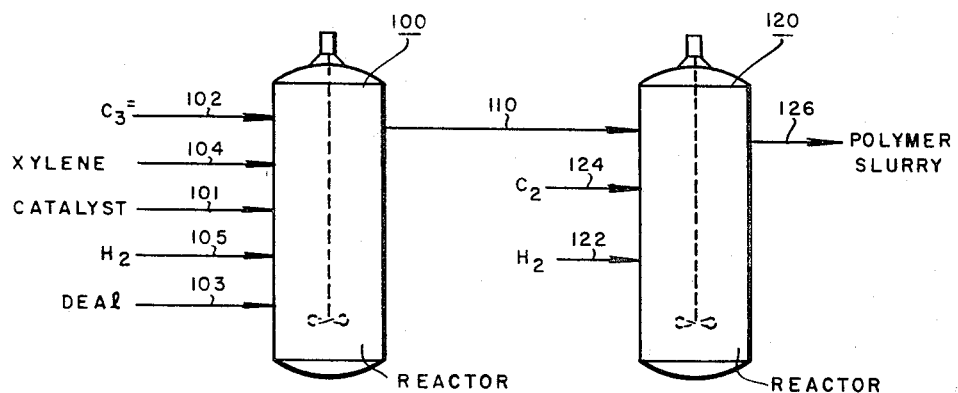

In producing an ethylene-propylene copolymer containing from 4 to 16 mol percent ethylene, from 500 to 3500 p.p.m. of hydrogen (based upon ethylene charged) are introduced into the second-stage reactor along with the ethylene feed, and the propylene-to-ethylene ratio in the second-stage reactor is preferably maintained within the range of 1:5 to 3:1.

---

The present invention relates to a method of producing an improved propylene-ethylene block copolymer. More particularly, the present invention relates to a two-stage block copolymerization process wherein propylene is polymerized in a first reaction zone to obtain a first reaction zone product which includes "living" polypropylene chains, and passing the first reaction zone product into a second reaction zone wherein ethylene is polymerized onto the "living" polypropylene chains in the presence of from 100 to 3500 p.p.m. of hydrogen (based on ethylene feed to the second reaction zone). The process of the present invention has two aspects, producing a propylene-ethylene block copolymer having superior qualities (1) as film-grade polymer; and (2) as molding-grade polymer.

Commercial polymers are produced in a variety of grades, depending upon the particular requirements of the customer. In the molding-grade field, the polymer should exhibit good flow characteristics during processing (so as to fill completely the mold cavity) and good impact strength especially at low temperatures (so that fabricated articles, such as containers, will not break when dropped). In the field of film-grade polymers, characteristics of low haze and high gloss, high stiffness, good impact strength and high tensile strength are desired. Propylene-ethylene block copolymers made by the process of the present invention are superior for both molding-grade and film-grade markets, the desired use dictating the amount of ethylene incorporated into the block copolymer and the minimum hydrogen concentration in the second reaction zone.

In the present process, the polymerization is carried out in two reaction zones, with hydrogen (0 to 200 p.p.m. based on propylene, by weight) being introduced into the first reaction zone to control the molecular weight of the polypropylene portion of the final product, as is well known in the art. (See Hercules Patent No. 3,051,690.) By the present invention, it has been found unexpectedly that the addition of hydrogen also into the second reaction zone concurrent with the addition of ethylene results in an improvement in the characteristics of block copolymers containing from 4 to 30 mol percent of ethylene. For molding-grade polymer (8 to 30 mol percent ethylene, preferably about 10 to 22%), the hydrogen concentration in the second stage will range from 100 to 1800 p.p.m. by weight (based upon the hydrogen and ethylene introduced into the second reaction zone), whereas for film grade (4 to 16 mol percent preferably 8 to 12%), the hydrogen concentration is from 500 to 3500 p.p.m.

Figure 2:
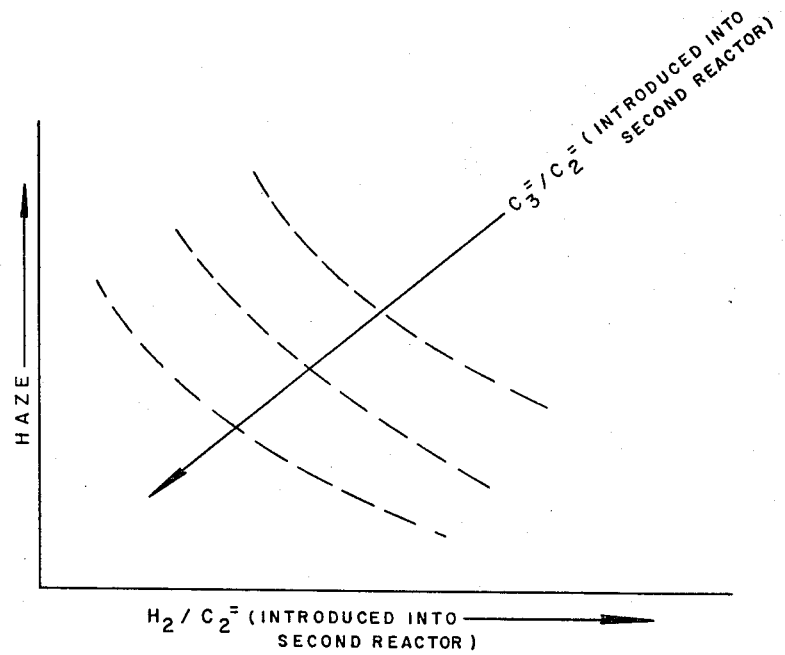
Figure 3:
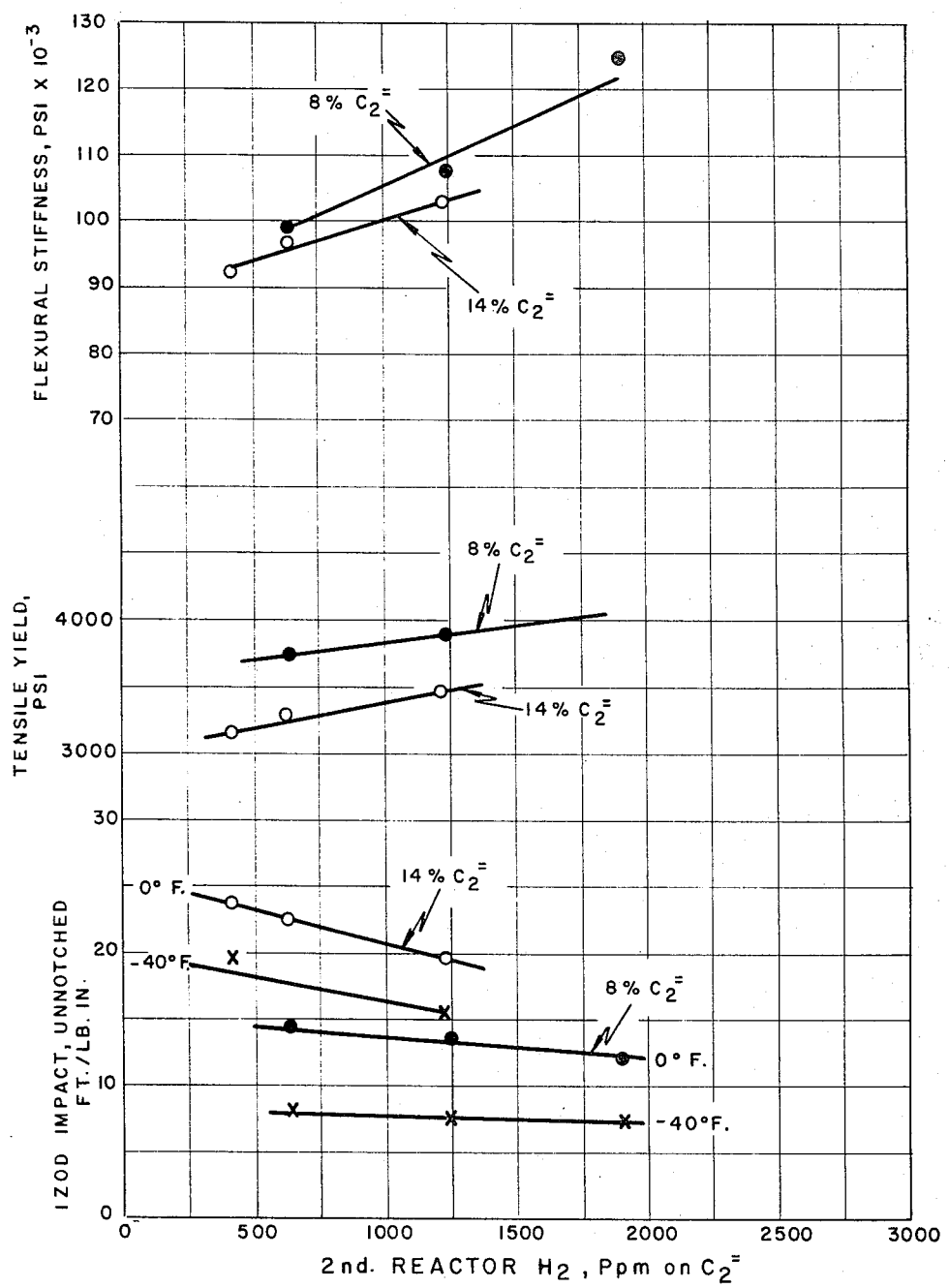

The present invention can best be understood by a specific discussion of the reaction variables in each reaction zone and of each aspect of the invention, and by reference to the drawings wherein:

FIG. 1 is a flow diagram of the present invention;
FIG. 2 is a curve representing the relationship of film haze to ethylene, propylene, and hydrogen introduced into the second-stage reactor; and
FIG. 3 is a representation of the effect of hydrogen addition and the percent ethylene in the final polymer on physical properties.

First reaction zone.—For both film and molding-grade products, the first reaction zone 100 is operated under conditions including a temperature of 145–180° F. (preferably 155–165° F.) and a pressure sufficient to maintain the reaction components in the liquid phase (preferably 75 to 90 p.s.i.g., but the upper pressure limit has very little effect on the reaction so long as the propylene remains in solution in the reaction solvent). A residence time of 2 to 8 hours (preferably about 5 hours) is employed.

The reaction zone 100 is preferably fitted with heat transfer means (not shown) in order to remove the heat of reaction and maintain the desired reaction temperature, and means for agitating the reaction mixture so as to maintain the components in constant admixture.

The catalyst feed line 101, propylene feed line 102 and catalyst modifier feed line 103 are provided for introducing these various streams into the reaction zone. The concentration of each component is best measured as proportional to the solvent which is fed into the reaction zone by way of line 104. Thus, upon the basis of 100 pounds of solvent fed through line 104, the catalyst rate will range from 0.04 to 0.1 pound (preferably 0.055 pound), the catalyst modifier from 0.08 to 0.16 pound (preferably 0.12 pound), and the propylene feed from 20 to 40 pounds (preferably 30 pounds). Hydrogen addition, through line 105, is based upon the total propylene feed through line 102, and ranges from 0 (for blow molding grade) to 200 (high melt index type) p.p.m. by weight, preferably 50 p.p.m.

The catalyst is a Ziegler polymerization catalyst, solid, stereospecific, and made up of a primary component and a secondary component. The primary component preferably will be a halide of a transition element from the fourth to sixth subgroups of the Periodic Table such as titanium, zirconium, vanadium, molybdenum, chromium, tungsten, etc. The transition metal halides may be employed at a reduced valance. Reduction can be and preferably is accomplished with aluminum. Titanium is a preferred transition metal and may be used in the tetrachloride or preferably in the trichloride form. In addition to titanium, tetra- and trichloride, exemplary metal halides include titanium tetrabromide, titanium tribromide, zirconium tetrachloride, zirconium tetrabromide, vanadium trichloride, molybdenum tetrachloride, chromium trichloride, etc.

The secondary component is formed during the aluminum reduction of the catalyst, and will be an aluminum halide. Aluminum trichloride is preferred.

The mol ratio of the primary component to the secondary component is preferably about 3:1, and the preferred catalyst is $TiCl_3 \cdot \frac{1}{3} AlCl_3$.

The catalyst modifier is also employed to increase the activity of the catalyst, and is chosen from the group consisting of the alkyl metal halides or trialkyl aluminum. Exemplary modifiers are diethyl aluminum chloride and triethyl aluminum. It is preferred in the invention to use diethyl aluminum chloride, in combination with $$TiCl_3 \cdot \tfrac{1}{3} AlCl_3$$

in a ratio so as to produce an Al/Ti mol ratio within the range of 1.5:1 to 4.5:1, preferably about 2 to 2.5:1. In calculating this Al/Ti ratio, only the aluminum in the modifier is used.

The solvent which is employed is any of the well-known group of stereospecific polymerization solvents. These solvents may be chosen broadly from the group of hydrocarbons, aromatic or aliphatic, which are nonpolar and which will not react either with the olefin, the catalyst, or the products of polymerization. Exemplary solvents, for example, are: aliphatic alkanes or cycloaklanes such as propane, butane, pentane, hexane, heptane, n-octane, isooctane, etc.; cycloparaffins such as cyclohexane, tetralin or decalin; high molecular weight paraffins or mixtures of paraffins which are liquid at the reaction temperature; aromatic hydrocarbons such as benzene, toluene, isomeric xylenes, etc., alkyl benzenes such as ethyl benzene, isopropyl benzene, ethyl toluene, n-propylbenzene, diethylbenzene, mono- and dialkyl naphthalenes; and other well-known inert hydrocarbons can also be employed. Alkyl cyclohexanes such as methyl cyclohexane may be employed to good advantage. The preferred solvent for use in the present invention is a mixture of isomeric xylenes which, for example, might contain 67% meta, 4% ortho, 13% paraxylenes, and ethyl benzene 16%.

The reaction is carried out in the first reaction zone so as to obtain from 80% to 97% conversion of the propylene feed, preferably from 85% to 90%.

The reaction product which is obtained from the first reaction zone includes dead polypropylene, living polypropylene chains, the catalyst, catalyst modifier, a small amount of unreacted propylene (0.3 to 8.0 pounds per hundred pounds of xylene), but preferably no hydrogen will be carried into the second reactor. It is to be noted that the total effluent from the first reaction zone is charged into the second reaction zone by way of line 110.

Second reaction zone.—The second reaction zone 120 is maintained under reaction conditions chosen to produce the desired polymer product. For both film grade and molding grade polymer, the pressure will be sufficient to maintain the reaction in the liquid phase (preferably at least 60 p.s.i.g.), the residence time is within the range of 1 to 6 hours (preferably 3.5 hours), and the total effluent from the first reaction zone will be charged into the second reaction zone to provide all of the catalyst to be employed in the second reaction zone. Ethylene is charged at a rate of 0.75 to 10 pounds per 100 pounds of solvent charged to the first reactor; propylene, 0.3 to 8.0 pounds per 100 pounds.

Generally, as mall amount of additional solvent will be introduced into the second reaction zone (e.g., to aid in temperature control), but the basis for expressing charge rates is more conveniently based on the solvent charged into the first reaction zone only. Thus, charge rates to the second reaction zone are based only on the solvent charged to the first reaction zone.

Keeping this in mind, the differences in second reaction zone conditions can be discussed below.

For film-grade polymer, a temperature of 148° F. to 165° F. is preferred, and the hydrogen feed rate (through line 122) would be from 500 to 3500 p.p.m. by weight (based on ethylene charged through line 124), preferably 1250 p.p.m. The propylene/ethylene mol ratio will be between 1:5 and 3:1, preferably 1:2. Reaction conditions are chosen so as to obtain a product containing from 4 to 16 mol percent ethylene, preferably 8% to 10%.

For molding-grade polymer, a temperature of 125° F. to 150° F. is preferred, and the hydrogen feed rate would be from 100 to 1800 p.p.m. by weight (based on the ethylene feed rate), preferably 1200 p.p.m. The propylene/ethylene mol ratio will be between 1:10 and 3:1, preferably 0.4:1. Reaction conditions are chosen so as to obtain a product containing from 8 to 30 mol percent, preferably from 10 to 22 mol percent.

All of these variables can be clearly compared and understood by reference to Table I, below.

TABLE I.—REACTION VARIABLES

| | Film grade | | Molding grade | | Both | |
|---|---|---|---|---|---|---|
| | Broad | Pref. | Broad | Pref. | Broad | Pref. |
| First reaction zone: | | | | | | |
| Temp., °F | | | | | 145–180 | 155–165 |
| Press, p.s.i.g | | | | | >70 | 75–90 |
| Residence time, hr | | | | | 2–8 | 5 |
| $C_3^=$, lb | | | | | 20–40 | 30 |
| Catalyst, lb | | | | | .04–0.1 | 0.055 |
| DEAlCl, lb | | | | | .08–0.16 | 0.12 |
| Al/Ti | | | | | 1.5–4.5 | 2–2.5 |
| $H_2/C_3^=$, wt | | | | | 0–200 | 50 |
| $C_3^=$, conv | | | | | 80–97 | 85–90 |
| Solvent,[1] lb | 100 | 100 | 100 | 100 | 100 | 100 |
| Second reaction zone: | | | | | | |
| Temp., °F | 145–180 | 160 | 125–150 | 130 | 125–180 | |
| Press, p.s.i.g | >30 | [2] >60 | >30 | >60 (75) | >30 | >60 (75) |
| Res. time, hrs | 1–6 | 3.5 | 1–6 | 3.5 | 1–6 | 3.5 |
| $C_3^=$, lb | 0.3–8.0 | 3.0 | 0.3–8.0 | 3.0 | 0.3–8.0 | 3.0 |
| $C_2^=$, lb | 0.5–6.0 | 3.0 | 1.0–9.0 | 4.5 | 0.75–10.0 | |
| $C_3^=/C_2^=$ mol | 1:5–3:1 | 1:2 | 1:10–3:1 | 0.4:1 | 1:10–3:1 | |
| $H_2/C_2^=$ wt | 500–3,500 | 1,250 | 100–1,800 | 1,200 | 100–3,500 | |
| Solvent, lb | 0–60 | 20 | 10–150 | 100 | 0–150 | |
| Product $C_2^=$ content, mol percent | 4–16 | 8–12 | 8–30 | 10–22 | 4–30 | |

[1] All charge rates based on 100 lbs. of solvent charged into the first-stage reactor.
[2] E.g. 75.

Product work-up.—After reaction in the second stage, wherein the ethylene is added as a block upon the end of polypropylene living chains, a product is recovered by way of line 126 for work-up and recovery by the well-known methods usually employed in Ziegler polymer systems. Polymer rejection is adjusted to obtain a maximum of 10% ether solubles in the polymer. This is accomplished by controlled precipitation using one of the lower molecular weight alcohols such as methanol or isopropanol. The final polymer product, after separation from the solvent, will comprise an admixture of homopolypropylene and propylene-ethylene copolymer. As shown above, the ethylene content of the total product will range from 4 to 30 mol percent. In the film-grade product, this ethylene will range from 4 to 16 mol percent, whereas, in the molding or impact grade, it will range from 8 to 30 mol percent.

Each aspect of the invention is discussed below, keeping in mind the above general treatment of the process.

Film grade

Commercial film-grade polymers should exhibit low haze and high gloss, good impact strength, and high stiffness. Propylene-ethylene copolymers have heretofore been prepared in a two-stage process wherein propylene is reacted in a first stage in the presence of hydrogen (to control molecular weight), and the polymer product of the first stage is reacted with ethylene in the second stage to produce the copolymer. Poor optical properties have been obtained, both gloss and haze being unsuitable for film-grade use, although the impact and tensile strengths have been good.

By the present invention, it has been found that the optical properties can be markedly improved, with no deleterious effects on the physical properties, or the physical properties improved with no deterioration of optical properties, by introducing hydrogen into the second stage of the process. It has also been found that the optical qualities are affected by the propylene-to-ethlene ($C_3^=/C_2^=$) feed ratio into the second reactor, as well as upon the hydrogen-to-ethylene ($H_2/C_2^=$) feed ratio into the second reactor.

It has been found that at a constant $C_3^=/C_2^=$ ratio, the haze in copolymer film decreases with increasing $H_2/C_2^=$ ratio, and at a constant hydrogen level, decreases with an increasing $C_3^=/C_2^=$ ratio. This relationship is shown qualitatively in FIG. 2 and semiquantitatively in Table II, below.

quired where less propylene is used. The $C_3^=/C_2^=$ ratio has a practical upper limit of about 3:1, however, since above that ratio the stiffness begins to suffer. At higher $C_3^=/C_2^=$ ratios, the reaction produces a highly random EP polymer "tail" for the polypropylene chain, whereas the present invention contemplates only a slight inclusion of propylene with the ethylene chain appended to the polypropylene product of the first reactor.

The $H_2/C_2^=$ ratio for film-grade use is preferably at least 1250 p.p.m. (wt.). An upper limit of 3500 p.p.m. (wt.) is chosen because there is no economic justification for any higher levels.

For film-grade copolymers, then, the process contemplates producing a propylene-ethylene copolymer having from 4 to 16 mol percent ethylene in the final product, and employing in the second reactor a $C_3^=/C_2^=$ mol ratio of 1:5 to 3:1 and a $H_2/C_2^=$ wt. ratio of 500 to 3500 p.p.m.

In order to illustrate the production of film-grade polymer, several exemplary runs were carried out while employing the flow scheme above discussed in connection with FIG. 1. The results are summarized below in Table III. The products of each run were collected and the film properties determined. Since the film drawing machine can modify the optical and physical properties of the film to a certain extent, the film samples of each batch which exhibited the best characteristics were chosen as exemplary of the maximum that could be obtained from the respective process operating conditions.

TABLE III

| Run No. | PEX-130 | PEX-135 | PEX-139 | PEX-145 |
|---|---|---|---|---|
| First Reactor: | | | | |
| Propylene, lbs./100 lbs. xylene | 9.52 | 9.33 | .796 | 8.83 |
| Hydrogen/$C_3^-$, p.p.m. (wt.) | 51 | 57 | 75 | 67 |
| Catalyst, lbs./100 lbs. xylene | .0600 | .0511 | .0579 | .0561 |
| Diethylaluminum chloride, lbs./100 lbs. xylene | .1627 | .1376 | .1554 | .1524 |
| Al/Ti mol ratio | 4.5 | 4.4 | 4.4 | 4.5 |
| Temperature, °F | 149 | 149 | 150 | 150 |
| Pressure, p.s.i.g. | 75 | 75 | 74 | 74 |
| Residence time, hrs. | 2.70 | 2.74 | 3.07 | 3.08 |
| Propylene conversion, percent | 82.8 | 84.6 | 81.6 | 92.1 |
| Second Reactor: | | | | |
| Propylene, lbs./100 lbs. xylene | 4.34 | 1.44 | 1.46 | 0.7 |
| Ethylene, lbs./100 lbs. xylene | 0.55 | 0.58 | 0.65 | 0.89 |
| Hydrogen/$C_2^-$, p.p.m. (wt.) | 0 | 885 | 0 | 1245 |
| Propylene/$C_2^-$, mol ratio | 5.3 | 1.66 | 1.46 | 0.53 |
| Catalyst, lbs./100 lbs. xylene | | | | |
| Diethylaluminum chloride, lbs./100 lbs. xylene | | Carried over from first reactor | | |
| Al/Ti mol ratio | | | | |
| Temperature, °F | 149 | 151 | 149 | 148 |
| Pressure, p.s.i.g. | 75 | 75 | 75 | 80 |
| Residence time, hrs. | 1.84 | 1.91 | 2.16 | 2.16 |
| Propylene conversion, percent | 87.1 | 71.5 | 74.0 | 72.9 |
| Ethylene conversion, percent | 98.6 | 98.6 | 98.6 | 99.0 |
| Polymer Properties: | | | | |
| Ethylene content, mol percent | 4.6 | 4.6 | 7.6 | 7.8 |
| Heptane insolubles, wt. percent on dry powder | 81.3 | 84.5 | 84.2 | 87.5 |
| Density, g./cc. | 0.866 | 0.893 | 0.897 | 0.903 |
| Melt index (g./10 min.) | 5.9 | 6.0 | 7.2 | 6.9 |
| Film Properties: [1] | | | | |
| Haze, percent | 1.5 | 2.1 | 6.3 | 1.0 |
| Gloss MO (deg.) | 136(60) | 134(60) | 67(45) | 85(45) |
| Falling ball impact at 20° F., ft.-lbs./mil. | 0.256 | 0.253 | 0.102 | 0.059 |
| 1% secant modulus, p.s.i. (stiffness) | 68,000 | 92,700 | 92,400 | 108,500 |

[1] No additives.

TABLE II.—FILM OPTICAL PROPERTIES AND SECOND REACTOR FEED TARIOS

| $H_2/C_2^-$, p.p.m. (wt.) | Film Haze, percent [1] at $C_3^-/C_2^-$ ratios | |
|---|---|---|
| | 2:1 | 2:3 |
| 0 | 6 | >50 |
| 800 | <1 | >50 |
| 1,250 | <1 | <1 |
| 1,750 | <1 | <1 |

[1] Film haze is measured as the ratio of diffused transmittance to total light transmittance, expressed as a percent. See ASTMD-1003-61 for the test method.

Thus, it is seen that no hydrogen added, film haze was unsatisfactory (i.e., greater than 2%) at $C_3^=/C_2^=$ ratios of 2:1 and 2:3. The addition of only 800 p.p.m. of hydrogen was sufficient to clear up the haze at a $C_3^=/C_2^=$ ratio of 2:1, whereas 1250 p.p.m. were required at a ratio of 2:3. This is believed to reflect the function of propylene as a haze-reducing agent, so that more hydrogen will be re- A comparison of Runs PEX-130 and PEX-135 shows the improvement in physical properties which can be obtained in polymers having approximately the same optical properties. PEX-130, containing 4.6% ethylene and having satisfactory film properties of 1.5% haze and a 136 gloss, has a stiffness of only 68,000 p.s.i. No hydrogen was introduced into the second-stage reactor in the production of the PEX-130 polymer. A polymer produced under similar conditions in Run PEX-135 has a 92,700 p.s.i. stiffness. It is believed that this improvement in stiffness, at the same level of optical properties is due to the fact that with no hydrogen substantial propylene must be introduced into the second-stage reactor in order to decrease the haze in the film produced. Attention is directed to the fact that the propylene-to-ethylene ratio was 5.3 in Run PEX-13, compared to a ratio of only 1.66 in Run PEX-135 where the haze was controlled by introducing 885 p.p.m. of hydrogen per part of ethylene.

In order to illustrate even more forcefully the improvement in haze characteristics which can be accomplished by the introduction of hydrogen, Runs PSX–139 and PEX–145 illustrate the difference in optical characteristics which are obtained in two polymers having approximately the same ethylene content and approximately the same physical properties. Note that in Run PEX–145 the hydrogen addition at the rate of 1245 p.p.m. was coupled with a low propylene-to-ethylene ratio (0.53), while in Run PEX– 139 where no hydrogen was employed a propylene-to-ethylene ratio of only 1.46 was employed. The resulting optical qualities are significant. The haze in PEX–139 is 6.3, as compared to 1.0 in PEX–145. Gloss in PEX–139 is only 67, as compared to 85 in PEX–145. Even the physical properties are better in PEX–145, it being noted that the stiffness is 108,500 as compared to only 92,400 in PEX–139.

Comparing PEX–139 with PEX–135, it is seen that the propylene-to-ethylene ratio of 1.46 which was employed in PEX–139 did not significantly improve the physical or optical properties, as might have been expected by noting the 1.66 ratio in Run PEX–135.

However, Run PEX–135 included 885 p.p.m. of hydrogen in the second stage, while PEX–139 had none. Thus, it is clearly shown that introduction of hydrogen into the second-stage reactor must be employed if the improved optical and physical properties are concurrently to be obtained.

Thus, the present invention provides an improved process for preparing film-grade propylene-ethylene copolymers.

Molding grade

As has been heretofore set forth, a molding grade polymer should exhibit good flow characteristics and good impact strength, particularly at low temperatures. The second aspect of the present invention relates to an improvement of both of these characteristics without adverse effect on the tensile strength or stiffness.

Molding (injection) grade propylene-ethylene copolymers contain from 8 to 30 mol percent ethylene in the final product, preferably 10 to 22 mol percent. The reaction in the second stage is desirably limited to ethylene only, but some propylene will be incorporated into the ethylene moiety of the copolymer chain. It has been found that, by introducing hydrogen into the second-stage reactor, propylene conversion can be reduced and a more uniform polyethylene moiety obtained. This is evidenced by the ratio of infrared absorbency at 720 cm.$^{-1}$ to the absorbency at 730 cm.$^{-1}$. Higher ratios indicate higher uniformity in the polyethylene moiety, and values of 1.1 and above are indicative of "sharp-block" copolymers, where the inclusion of propylene into the ethylene moiety is at a practical minimum.

Referring now to FIG. 3, the physical properties of impact strength, tensile strength at yield, and flexural stiffness are shown as functions of the ethylene content of the polymer product, with the parts per million of hydrogen based on ethylene in the second-stage reactor being set forth. It is noted that at a constant hydrogen concentration, the physical properties of stiffness and of tensile at yield tend to decrease with an increasing propylene-to-ethylene ratio, while the impact strength increases. It is also seen that at a constant propylene-to-ethylene ratio the flexural stiffness and tensile strength increase with the increasing concentration of hydrogen in the second-stage reactor, while the impact strength decreases. Thus, it is possible by adjusting the amount of hydrogen in the second-stage reactor to balance off the tensile strength and flexural stiffness against the impact strength, to obtain a desired combination of properties, paying for the increase in tensile strength and flexural stiffness by suffering a slight decrease in the impact strength.

This is important in that the propylene-to-ethylene mol ratio in the second-stage reactor is very difficult to control. The amount of propylene which is carried into the second-stage reactor depends upon conversion in the first stage, and is a variable which is extremely difficult to control. Thus, by the simple expedient of adding hydrogen into the second-stage reactor, a polymer for injection molding can be produced which has a superior combination of physical properties.

The final product for injection molding grade will contain from 8 to 30 mol percent ethylene. In order to obtain a product having this amount of ethylene incorporated into it, the propylene-to-ethylene mol ratio should be maintained as low as possible. Thus, the propylene-to-ethylene ratio in the feed to the second reactor should range from 1:10 to 3:1 (preferably 0.4:1). The effect of the hydrogen addition is probably continuous from the introduction of the first small amount of hydrogen up to extremely high levels, but the effect upon physical properties does not begin to become apparent until the hydrogen level reaches about 100 p.p.m. From 100 to 1800 p.p.m. of hydrogen (preferably 1500) are introduced.

Summary

Thus, it is seen that the present invention contemplates the introduction into the second-stage reactor of from 100 to 3500 p.p.m. of hydrogen while maintaining the propylene-to-ethylene ratio within the range of 1:10 to 3:1 under conditions to produce a copolymer containing from 4 to 30 mol percent ethylene. The hydrogen addition into the second-stage reactor is continuous, and concurrent with the introduction of living polypropylene, unreacted propylene, and ethylene feed.

Having disclosed the present invention in detail, and having set out specific embodiments thereof, what is intended to be covered by Letters Patent is to be limited only by the appended claims.

We claim:

1. In the production of a propylene-ethylene block copolymer, wherein propylene is polymerized in a first reaction zone to obtain a first reaction zone product containing living polypropylene chains, and ethylene is continuously polymerized onto the living polypropylene chain in a second reaction zone wherein the reaction conditions are chosen so that the block copolymer product contains from 4 to 30 mol percent ethylene, and wherein the propylene-to-ethylene mol ratio in the second reaction zone is within the range of from 1:10 to 3:1,
  the improvement of conducting the second reaction zone polymerization in the presence of 100 to 3500 p.p.m. of hydrogen by weight, based on the ethylene feed admitted into the second reaction zone.

2. A method in accordance with claim 1 wherein the block copolymer is a film-grade product which contains from 4 to 16 mol percent ethylene, the concentration of hydrogen is from 500 to 3500 p.p.m. by weight based upon the ethylene feed admitted into the second reaction zone, and the propylene-to-ethylene feed ratio into the second reaction zone is within the range from 1:5 to 3:1.

3. A method in accordance with claim 1 wherein the block copolymer is a molding-grade product which contains from 8 to 30 mol percent ethylene, the concentration of hydrogen is from 100 to 1800 p.p.m. by weight based upon the ethylene feed admitted into the second reaction zone, and the propylene-to-ethylene feed mol ratio in the second reaction zone is within the range from 1:10 to 3:1.

4. In the production of a block copolymer of propylene and ethylene, wherein propylene is reacted in a first reaction zone at a temperature of 145° F. to 180° F. in contact with a Ziegler catalyst to obtain a first reaction zone product containing living polypropylene chains, and ethylene is continuously polymerized onto the living polypropylene chains in a second reaction zone at a temperature of 125° F. to 180° F., in contact with a Ziegler polymerization catalyst wherein the reaction conditions are chosen so that the block copolymer product contains from 4 to 30 mol percent ethylene, and wherein the propylene-to-ethylene mol ratio in the second reaction zone is within the range of from 1:10 to 3:1, the improvement of conducting the second reaction zone polymerization in the presence of 100 to 3500 p.p.m. of hydrogen by weight based on the ethylene feed admitted into the second reaction zone, at least a portion of said hydrogen being separately added into said second reaction zone.

5. A method in accordance with claim 4 wherein the block copolymer product contains from 4 to 16 mol percent ethylene, the propylene-to-ethylene mol ratio in the second reaction zone is within the range from 1:5 to 3:1, and the hydrogen-to-ethylene feed ratio into the second reaction zone is from 500 p.p.m. to 3500 p.p.m., by weight.

6. A method in accordance with claim 4 wherein the copolymer product contains from 8 to 30 mol percent ethylene, and the hydrogen-to-ethylene feed ratio into the second reaction zone is from 100 to 1800 p.p.m., by weight.

7. In the production of a block copolymer of propylene and ethylene, wherein propylene is reacted in a first reaction zone under conditions including
a temperature of 145° F. to 180° F.,
a pressure greater than 70 p.s.i.g., and
a residence time of from 2 to 8 hours, and
the relative charge rates of the various components being

|  | Pounds |
|---|---|
| Solvent | 100 |
| Propylene | 20–40 |
| Ziegler catalyst | .04–0.1 |
| Diethyl aluminum chloride | 0.08–0.16 | the diethyl aluminum chloride and Ziegler catalyst being used in such proportions as to give an aluminum-titanium mol ratio within the range of 1.5:1 to 4.5:1, and wherein the propylene conversion is within the range of 80% to 97%,
whereby a first reaction zone product is obtained which contains living polypropylene chains, unreacted propylene, and polypropylene homopolymer, the improvement of
introducing the total effluent from the first reaction zone into a second reaction zone wherein ethylene is polymerized onto the living polypropylene chains under conditions including
a temperature within the range of 125° F. to 180° F.,
a pressure above 30 p.s.i.g., and
a residence time of 1 to 6 hours,
wherein ethylene is charged into the second reaction zone at a rate of 0.75 to 10.0 pounds per 100 pounds of solvent charged to the first reaction zone to obtain a propylene-to-ethylene feed mol ratio from 1:5 to 3:1,
and wherein hydrogen is introduced at a concentration from 100 to 3500 p.p.m. by weight, based upon the ethylene feed admitted into the second reaction zone,
whereby an ethylene-propylene block copolymr is obtained which contains from 4 to 30 mol percent ethylene and has improved characteristics for use in film-grade and molding-grade applications.

8. A method in accordance with claim 7 wherein in the second reaction zone
the temperature is from 148° F. to 165° F.,
the pressure is above 60 p.s.i.g.,
the propylene-to-ethylene mol ratio is from 1:5 to 3:1,
the hydrogen concentration is from 500 to 3500 p.p.m., and
the product polymer contains from 4 to 16 mol percent ethylene.

9. A method in accordance with claim 7 wherein in the second reaction zone
the temperature is about 160° F.,
the pressure is about 75 p.s.i.g.,
the residence time is about 3.5 hours,
the propylene-to-ethylene mol ratio is about 1:2,
the hydrogen concentration is about 1250 p.p.m., and
the product polymer contains from 8 to 12 mol percent ethylene.

10. A method in accordance with claim 7 wherein in the second reaction zone
the temperature is from 125° F. to 150° F.,
the pressure is above 60 p.s.i.g.,
the propylene-to-ethylene mol ratio is from 1:10 to 3:1,
the hydrogen concentration is from 100 to 1800 p.p.m., and
the product polymer contains from 8 to 30 mol percent ethylene.

11. A method in accordance with claim 7 wherein in the second reaction zone
the temperature is about 130° F.,
the pressure is about 75 p.s.i.g.,
the residence time is about 3.5 hours,
the propylene-to-ethylene mol ratio is about 0.4:1,
the hydrogen concentration is about 1200 p.p.m., and
the product polymer contains from 10 to 22 mol percent ethylene.

12. In the production of a block copolymer of propylene and ethylene, wherein propylene is reacted in a first reaction zone under conditions including
a temperature of 155° F. to 165° F.,
a pressure of 75 to 90 p.s.i.g.,
a residence time of about 5 hours, and
the relative charge rates of the various components being

|  | Pounds |
|---|---|
| Solvent | 100 |
| Propylene | ca. 30 |
| Ziegler catalyst | ca. 0.055 |
| and Diethyl aluminum chloride | ca. 0.12 | the diethyl aluminum chloride and Ziegler catalyst being used in such proportions as to given an aluminum/titanium mol ratio of about 2:1 to 2.5:1,
and wherein the propylene conversion is within the range of 85% to 90%,
whereby a first reaction zone product is obtained which contains living polypropylene chains, unreacted propylene, and polypropylene homopolymer, the improvement of
introducing the total effluent from the first reaction zone into a second reaction zone wherein ethylene is polymerized onto the living polypropylene chains under conditions including
a temperature of 125° F. to 180° F.
a pressure above 30 p.s.i.g., and
a residence time of 1 to 6 hours,
wherein ethylene is charged into the second reaction zone at a rate of 0.75 to 10.0 pounds per 100 pounds of solvent charged to the first reaction zone, to obtain a propylene-to-ethylene feed mol ratio from 1:5 to 3:1,
and wherein hydrogen is introduced at a concentration from 100 to 3500 p.p.m. by weight, based upon the ethylene feed admitted into the second reaction zone,
whereby an ethylene-propylene block copolymer is obtained which contains from 4 to 30 mol percent ethylene and has improved characteristics for use in film-grade and molding-grade applications.

13. A method in accordance with claim 12 wherein in the second reaction zone
the temperature is about 160° F.,
the pressure is about 75 p.s.i.g.,
the residence time is about 3.5 hours, the propylene-to-ethylene mol ratio is about 1:2,
the hydrogen concentration is about 1250 p.p.m., and
the product polymer contains from 8 to 12 mol percent ethylene.

14. A method in accordance with claim 12 wherein in the second reaction zone
the temperature is about 130° F.,
the pressure is about 75 p.s.i.g.,
the residence time is about 3.5 hours,
the propylene-to-ethylene mol ratio is about 0.4:1,
the hydrogen concentration is about 1200 p.p.m., and
the product polymer contains from 10 to 22 mol percent ethylene.

References Cited

UNITED STATES PATENTS

| 3,200,173 | 8/1965 | Schilling | 260—878 |
| 3,301,921 | 1/1967 | Short | 260—898 |
| 3,268,624 | 8/1966 | Jezl et al. | 260—878 |

FOREIGN PATENTS

| 889,230 | 2/1962 | Great Britain. |

MURRAY TILLMAN, *Primary Examiner.*

M. J. TULLY, *Assistant Examiner.*